United States Patent Office 3,513,144
Patented May 19, 1970

3,513,144
POLYTETRAFLUOROETHYLENE
FIBROUS POWDERS
Yutaka Kometani, Hyogo-ken, Shun Koizumi, Osaka, and
Katuo Kubota and Takeaki Nakazima, Osaka-fu, Japan,
assignors to Daikin Kogyo Co., Ltd., Osaka, Japan, a
corporation of Japan
No Drawing. Continuation of application Ser. No.
403,366, Oct. 12, 1964. This application Apr. 3,
1969, Ser. No. 858,547
Claims priority, application Japan, Oct. 14, 1963,
38/54,482; Nov. 11, 1963, 38/60,288
Int. Cl. C08f 3/24
U.S. Cl. 260—92.1      2 Claims

ABSTRACT OF THE DISCLOSURE

A process for preparing polytetrafluoroethylene fibrous powder and product produced therefrom, said fibrous powder having an average fiber length of 100 to 5,000 microns, an average shape factor of not less than 10, and an anisotropic expansion factor of 1.3–7.0.

---

This invention relates to polytetrafluoroethylene fibrous powders and a process for producing the same.

Polytetrafluoroethylene is a polymeric material which is especially outstanding in its resistance to heat and chemicals as well as in that it possesses excellent mechanical and electrical properties. Hence, it is being used widely in industry. Further, as its uses range over a wide field, numerous forms thereof to meet the requirements of these uses have been conceived and invented. Namely, a molding powder of particle size less than 50 microns has been developed for the purpose of obtaining nonporous shaped articles, while the "polytetrafluoroethylene fine powder" obtained by coagulating an aqueous dispersion obtained by emulsion polymerization is suited for paste extrusion molding. On the other hand, fillered polytetrafluoroethylenes in which has been mixed as a filler the various metallic powders or glass fibers are suited for bearing materials. A new use of polytetraethylene which has been attracting wide attention in recent years is its use as filter material where its property of superior resistance to chemicals has been utilized. Thus, a number of filter sheets, cloths, etc., of polytetrafluoroethylene have been developed. In all cases, however, there were such defects as that their strength was not satisfactory or that their cost was high, and hence their use has not become sufficiently widespread. Particularly, in the case of paper and filter papre of polytetrafluoroethylene, it was not even possible to make them strong and uniform in a thickness of less than 200 g./m.². This was not due to the inherent property of polytetrafluoroethylene but was due to the fact that the conventional material forms of polytetrafluoroethylene were not suited for the production of these papers, etc.

An object of the present invention is to provide a new polytetrafluoroethylene fibrous powders, which new fibrous polytetrafluoroethylene powders are suited for the production of a strong paper predominantly of polytetrafluoroethylene whose thickness is less than 200 g./m.² and also thick but pliable thick sheets and paper boards and filter fiber. Another object of the invention is to provide a process for producing the foregoing new polytetrafluoroethylene fibrous powder at low cost.

The polytetrafluoroethylene fibrous powders according to this invention are characterized by having an average fiber length of 100–5000 microns, an average shape factor of not less than 10 and an anisotropic expansion factor of 1.3–7.0.

While the use of the invented polytetrafluoroethylene fibrous powder is not necessarily limited in its being used as filter material predominantly of polytetrafluoroethylene, the characteristics of the new form of polytetrafluoroethylene fibrous powder will be described in detail with emphasis being laid on the production of a filter material.

The conventional polytetrafluoroethylene powders or the cut fibers are not suitable for producing such filter materials as a strong paper of a thickness of less than 200 g./m.² and pliable sheets or paperlike structures, etc. The reason therefor is that unless the particles are fibrous, the interlacement that occurs between fibers do not take place and hence good quality paper cannot be made. Namely, the powder which heretofore was readily available commercially was in nearly all cases not fibrous, with the consequence that paper and sheets could not be made. Since the average shape factor is a factor which numerically expresses the extent of the fibrous state, the interlacement does not occur fully substantially when this factor is less than 10.

However, even though the powder may be of fibrous form, if its fiber length is less than 100 microns, the length of the fiber is too short and hence in this case also it cannot be made into paper, as the interlacement between the fibers is insufficient. As commercially available powders of this grade, there is one which has an average particle diameter of 35 microns, a shape factor of 8–12 and an anisotropic expansion factor of 1.16–1.28. As a practical matter, a paper cannot be made from this powder, however. In this case, the fact that its shape factor is small and the extent of its fibrousness is meagre are also causes, but that its average fiber length is less than 100 microns is the major cause. When an attempt is made to make paper from a dispersion of this powder in accordance with the method described in the hereinafter given examples, it does not become paperlike because of the lack of interlacement between the fibers.

On the other hand, when the powder has an average fiber length exceeding 5000 microns, it is not suited for making thin but strong paper and sheets that are uniform, even though the other properties, including the shape factor and anisotropic expansion factor, are within the limits prescribed by this invention. Namely, when it exceeds 5000 microns, the irregularity in the surface of the paper made therefrom is pronounced. That is to say, when the fiber length is great, the diameter of the fibers are inevitably larger, with the consequence that the production of thin and uniform paper is impossible. As a process for producing this type of fibers, a process is known which comprises coagulating an aqueous dispersion of colloidal polytetrafluoroethylene obtained by the emulsion polymerization of tetrafluoroethylene, then drying this product to obtain polytetrafluoroethylene powder (hereinafter to be referred to as "fine powder" since it is usually so called), to which is added such as white oil, a petroleum fraction, which mixture is then made into a tube or rod by the so-called paste extrusion method, a customary procedure, then, after removing the additive, cut into 6–25 mm. lengths, followed by splitting these pieces in the extrusion direction by application of strong rubbing force to render them fibrous (U.S. Pat. No. 3,003,912).

The fibers obtained by this method can be formed into air-pervious boards or sheets, though entailing some difficulty. But since the fiber length is greater than 5000 microns, the board or sheet cannot be obtained with uniformity and thus there occurs spottiness in its strength. Further, thin papers of less than 200 g./m.² cannot possibly be made.

Further, the powder becomes unfit for making uniform thin papers, sheets and boards when its anistropic expansion factor is not less than 7.00, even though its other properties wall within those prescribed by the invention. Namely, the anistropic expansion factor is a measure of the molecular orientation in the fiber. Hence, as the molecular orientation increases, the anistropic expansion factor becomes greater. If the molecular orientation is great, the shrinkage of the fiber at above the melting point of polytetrafluoroethylene is inevitably great, and in consequence spottiness in the thickness of the product results because of the great shrinkage in the paper during its sintering step.

Fibers having a high degree of molecular orientation can be obtained by cutting the filament obtained by spinning the hereinbefore described aqueous dispersion of colloidal polytetrafluoroethylene. According to this method, the average shape factor of the fiber can be made to be not less than 10 and its fiber length can be made to range from 100 to 5000 microns. However, since the fiber is subjected to the action of a stretching force either deliberately or inevitably during the spinning process, a high degree of molecular orientation takes place in the fiber, with the consequence that the fiber will result in having an anistropic expansion factor of not less than 7.00. Accordingly, when an attempt is made to make the fibers obtained by this method into thin paper, sheets and paper boards, it is impossible to avoid the great shrinkage during the sintering step, and hence it is only possible to obtain products whose surface unevenness is pronounced.

When the anistropic expansion factor is not more than 1.3, the powder is not completely fibrous but is either of short fibers or an imperfect fibrous powder. Hence, when such a powder is made into paper, interlacement between the fibers do not occur sufficiently, with the consequence that good quality paper products cannot be obtained.

Thus it is apparent that in accordance with the prior art methods there did not exist a polytetrafluoromethylene powder which could be readily formed into a strong paper of a thickness less than 200 g./m.$^2$ or air-pervious and pliable sheets or paper boards.

The terms "average fiber length" and "average shape factor," as used herein, refer to values determined as follows: a small amount of Canada balsam is placed on a microscope slide glass. If the viscosity of the Canada balsam is high, its viscosity is lowered by adding a small amount of xylene. Taking a small amount of the powder to be tested, it is mixed well with the Canada balsam with the tip of a glass rod. Then when another slide glass is placed on top and pressed strongly, the powder disperses uniformly between the slide glasses. If the amount of powder is used in excess, the dispersion does not take place uniformly and the fibers become piled up on top of each other. Therefore, the amount of powder used must be small. Since the fibers disperse uniformly when the amount of the Canada balsam and the powder is proper, such an amount must be chosen. Next, five to twenty photomicrographs at 10–100 magnification are taken of this specimen at different locations. If one specimen is insufficient for the microscopic examination, two or more are prepared. The fiber length and width are determined from the photographs obtained. In this case, the particles of fiber length not exceeding 80 microns must not be measured. Since the average according to this measurement method is a number average, should those fibers not exceeding 80 microns the proportion by weight of which are very small are added to the number average, it will result in evaluating unjustifiably low the fiber length obtained, thus becoming a value far different from the actual fiber length. Hence, those of fiber length not exceeding 80 microns are excluded.

The number of fibers measured must be not less than 200. The arithmetic average of all the measured fibers is the "average fiber length." The width of each fiber is measured at the same time its length is measured. The width of a fiber is not necessarily the same even in case of the same fiber. Therefore, the width of that portion of a fiber occupying the longest part thereof is measured. The value obtained by dividing the fiber length by its width is the shape factor, and the arithmetic average of that of not less than 200 fibers is the "average shape factor."

The term "anistropic expansion factor" is determined by the following method: Four and one-tenth grams of powder is weighed into a 0.5 inch square metallic mold where it is subjected at 23° C. to a pressure raised to 2000 p.s.i. during one minute, after which it is held at this pressure for two minutes. The length, width and height of the resulting roughly cubical preform was measured (i.e., the X, Y and Z axis, respectively, where Z axis is the direction in which the preforming pressure was applied). The measure preform is sintered for 30 minutes at 380°±0.5° C., followed by allowing the resulting sintered product to cool in air to room temperature, after which it is remeasured. The anistropic expansion factor is then the value of $Zs/Zp$ divided by $(Xs+Ys)/(Xp+Yp)$, where $Xp$, $Yp$, $Zp$ are the respective axial measurements of the preform, while $Xs$, $Ys$ and $Zs$ are the axial measurements of the sintered product.

The term "specific surface area" denotes the specific surface areas as obtained customarily from the adsorption of nitrogen.

Upon microscopic examination at 10–100 magnification of the polytetrafluoroethylene fibrous powder of the present invention, it is observed that a great number of the particles are of complex fibrous form having a fiber length of not less than 80 microns. Further, the width of the fibers are not uniform; nor are their sections necessarily of circular shape. This powder is characterized by an average fiber length of 100–5000 microns, an average shape factor of not less than 10 and an anistropic expansion factor ranging between 1.30 and 7.00. Such a fibrous powder of the invention can be prepared in the following manner. A polytetrafluoroethylene powder which, after polymerization of tetrafluoroethylene, has been only washed and dried and having a specific surface area of 3 m.$^2$/g. or more is comminuted in a pulverizer which accomplishes its grinding action chiefly by means of a shearing force, the shredding action being intensified by raising the grinding speed and with the grinding being effected at a temperature above 30° C., and preferably above 70° C.

A still another characteristic of the powder so obtained becomes apparent when differential thermal analysis is carried out. For example, a differential thermal analyzer Model DT–10, a product of Shimadzu Seisakusho Ltd., Japan, was employed and the heat absorption of said powder was measured by customary procedures at a temperature rise of 10° C. per minute. As a result, it was found that after the heat absorption in the vicinity of 340–355° C. by means of the melting of the crystals, there appeared aditionally for 10 or more degrees on the high temperature side small shoulder of heat absorption. When observations are made with a polaroid miscroscope while raising the temperature, it can be seen that this small shoulder of heat absorption attends the change in shape of the fibrous powder. Namely, the temperature at which the crystals of the invention polytetrafluoroethylene fibrous powder melts and the temperature at which shrinkage takes place in the fibers differ, the later being higher. In the other method of obtaining polytetrafluoroetyhlene fibrous powders having an average fiber length of 10–5000 microns, an average shape factor of not less than 10 and an anisotropic expansion factor of above 1.30, for example, the method of obtaining fibers by cutting the polytetrafluoroethylene fiber obtained by spinning a colloidal dispersion of polytetrafluoroethylene, the shrinkage temperature of the fiber is equal to, if not lower than, the melting temperature of the crystals. Thus, the shoulder of the heat absorption is not observed subsequent to the melting point, when examined differential thermal analysis of polytetrafluoroethylene cutting fibers. Further, as regards the polytetrafluoroethylenes which are not fibrous, the shoulder of heat absorption is not observed following the melting point, since they are not fibrous. In addition, with respect to those whose anisotropic expansion factor is less than 1.30, even though they may be a fibrous powder, the shoulder of heat absorption following the melting point is hardly observable at all.

Since the polytetrafluoroethylene powder according to this invention possesses the characteristics as hereinbefore described, the self bonding between the fibers can be effected without entailing any shrinkage by sintering at a temperature which is above the melting point of the crystals of the polytetrafluoroethylene and also below that where shrinkage occurs in the fiber, even though the anisotropic expansion factor of the fibrous powder is above 1.30.

When the fibrous powder of the invention is formed into a felt and then sintered at a temperature of 300–360° C., thin paper of high strength or air-pervious sheets or boardlike structures can be produced. Satisfactorily employable is also a method which comprises mixing 0.5–50% by weight of a nonfibrous polytetrafluoroethylene powder having an average particle size of less than 500 microns, in the invention fibrous powder, then forming the mixture into a felt and sintering the mat. Namely, since the nonfibrous powder does not shrink after its melting and also because it becomes completely gelled by melting, the bonding between the fibers is effected more intimately.

Those powders used to particular advantage as the starting material include the "fine powder" obtained by coagulation of an aqueous dispersion of a colloidal polytetrafluoroethylene obtained readily by the emulsion polymerization of tetrafluoroethylene (this type of powder is readily available commercially); the tetrafluoroethylene copolymer not more than 0.5 micron in diameter obtained in customary manner by copolymerizing with tetrafluoroethylene several percent by weight of either $CF_2=CFR_f$ or $CF_2=CFOR_f$ of 3 to 10 carbon atoms, where $R_f$ is perfluoroalkyls; the powder obtained when tetrafluoroethylene is polymerized in the vapor phase by means of high energy radiation (hereinafter to be referred to as radiation polymreized powder); and the powder obtained by a method similar to the general suspension polymerization method and in which the value of specific surface area immediately after the polymerization exceeds 3 m.$^2$/g. (referred to as general molding powder). "fine powder" here described in practically all cases has a specific surface of 9–12 m.$^2$/g. or 6–13 m.$^2$/g. In those cases where this value is other than those given, they can be satisfactorily used if this value is more 3 m.$^2$/g. The specific surface area of the radiation polymerized powder is also above 4 m.$^2$/g., most of it being above 10 m.$^2$/g.

For example, fibrous powder cannot be obtained from those commercially readily available powders whose specific surface area is less than 3 m.$^2$/g. Even though a fibrous powder could be obtained, it would be one which does not possess the various properties as prescribed by the present invention, and hence it would be possible to obtain only fibers of inferior grade from which papers or sheetings could not be formed. In the case of the general molding powders, these also consist of those which can be readily made into fibers and those which are difficult to do so, depending upon the polymerization method. The criterion in the case is the specific surface area. That is to say, the polytetrafluoroethylene obtained by the suspension polymerization of gaseous tetrafluoroethylene in the presence of perfluoroolefin of 3 or 4 carbon atoms and after polymerization only washed with water and dried has a specific surface area greater than 3 m.$^2$/g. and hence can be made into fibers by pulverizing, but in the case of the suspension polymerization in water of liquid tetrafluoroethylene, the specific surface area becomes less than 3 m.$^2$/g. and thus staples cannot be obtained by pulverization of this powder.

The fact that there is a difference in the ease with which these powders can be made into fibers seems strange, but the present invention has clarified this phenomenon for the first time.

The pulverizer suited for obtaining the fibers according to this invention must be one in which a great shearing force is brought into action chiefly during the grinding stage. A pulverizer of this type which is readily available commercially include such as the cutting mill, the shearing roll mill, and the Micron Mill and Hurricane Mill, which grind by means of the rotative action of a multibladed rotor rotating at high speeds. While the grinding may be carried out in water or an atmosphere of either air or nitrogen, the temperature at which the grinding is carried out is a range between 30° C. and 327° C. The higher the temperature at which the grinding is carried out, the more readily is the ground product rendered fibrous and hence it is to be preferred, while on the other hand there is a decline in the yield. Accordingly, the optimum conditions must be chosen in consideration of the relationship between the ease with which the powder is rendered fibrous, the yield, the pulverizer used and the type of powder to be ground.

An apparatus especially suitable for grinding and classifying to obtain the new polytetrafluoroethylene of the present invention is commercially available under the name of "Micron Mill" or "Super Micron Mill" as products of Hosokawa Iron Works Ltd., Japan. The pulverixing chamber, the principal part of this apparatus, is provided with a multibladed pulverizing plate which rotates at high speed and next to it there is a grading plate which rotates coaxially with the pulverizing plate. Further, in the next chamber which is separated from the pulverizing chamber by means of a grain size adjusting ring there is provided a windmill rotating coaxially with the pulverizing and grading plates. There is also a pipe which communicates with a classifier. The powder to be ground consisting of polytetrafluoroethylene having a specific surface area of above 3 m.$^2$/g. is fed from a hopper to the pulverizing chamber where it is ground by means of the pulverizing plate having around its circumference blades of a thickness more than 10 mm. At this time, the powder is rendered highly fibrous by being subjected to a tearing force resulting from the abrasion of the powder with the housing wall and the rotation of the pulverizing plate. As a result of the vortical air stream in the rotating direction set up by the rotation of the pulverizing plate and the air stream along the axial direction set up by the suction of a blower disposed separately at the rear of the classifier, the powder which has been ground is drawn through the grading plates and the grain size adjusting ring at which it receives some classifying action to be then introduced into the classifier by means of the wind force set up by the windmill and the suction of the blower.

In this case, the velocity of the vortical air stream in the rotating direction and that of the air stream set up by the blower and flowing in the axial direction from the grading plate to the windmill as well as the inner diameter of the grain size adjusting ring have the greatest influence on the shape factor and average fiber length of the fibrous powder. Namely, while the degree to which the specimen is rendered fibrous becomes more pronounced as the velocity of the vortical air stream becomes greater than that of the air stream along the axial direction, the yield decreases. Conversely, as the velocity of the air stream along the axial direction becomes greater than that of the vortical air stream, the yield increases, but the degree of fibrousness of the product decreases. On the other hand, as the inner diameter of the grain size adjusting ring becomes greater, the degree of fibrousness of the product becomes less, since the powder moves to the classifier without receiving complete shearing action in the pulverizing chamber. It is however practically impossible to express these relationships numerically at the present state of the art. Even if it were possible, there would exist differences depending upon the size of the pulverizer used and its type. Hence, it would be necessary to determine the optimum conditions experimentally for each occasion. Namely, since the velocity of the vortical air stream is varied by an adjustment of the rotating speed of the pulverizer while that of air stream in the axial direction is by means of an adjustment of the suction of the blower, the foregoing optimum conditions are determined experimentally while effecting adjustments of these factors.

Although the classifier is of importance in determining the length and thickness of the resulting fibers, in those cases where a relatively coarse fibrous powder is desired, a classifier need not be used, it being possible to achieve the desired end with the hereinabove described Micron Mill type of pulverizer alone.

While the conditions imposed on the classifier useable for the purpose of this invention is not as strict as in the case of the pulverizer, unsuitable, for example, is such as the "seiving method" using a sieve. If it is a pneumatic classifier, any model thereof can be conveniently used.

Even when the raw powder has a specific surface area of above 3 m.$^2$/g., good quality fibrous powder cannot be obtained when the pulverizer used is one such as in which the grinding is carried out chiefly by impact force, for example, a pulverizer of the hammer type having freely moving hammers disposed about the circumference of rotating disks.

Thus, the polytetrafluoroethylene fibrous powder having an average fiber length of 100–5000 microns, an average shape factor of not less than 10 and an anisotropic expansion factor of 1.30–7.00, and suitable for the production of strong paper of a thinness less than 200 g./m.$^2$, air-pervious, pliable sheets and paper boards, and filter fiber can be conveniently produced by grinding at a temperature above 70° C., using a pulverizer of the type which effects the grinding under strong shearing force, a polytetrafluoroethylene powder such as that having a specific surface area of above 3 m.$^2$/g., which powder was only washed and dried after polymerization of tetrafluoroethylene.

For a better understanding of the invention, the following examples are given.

EXAMPLE 1

(A) Commercial grade polytetrafluoroethylene fine powder having a specific surface area of 9 m$^2$/g.

(B) Polytetrafluoroethylene having a specific surface area of 11 m.$^2$/g. polymerized in the vapor phase tetrafluoroethylene by means of gamma rays from cobalt-60.

(C) Polytetrafluoroethylene having a specific surface area of 3.5 m.$^2$/g. obtained by the suspension polymerization in the gaseous state at 60° C. of a gaseous tetrafluoroethylene whose proportion by weight of hexafluoropropylene at the start of the polymerization was 1%, using ammonium persulfate as catalyst.

(D) Polymer having a specific surface area of 2.5 m.$^2$/g. obtained by suspension polymerization in water at 3° C. of liquid tetrafluoroethylene, using ammonium persulfate, acid sodium bisulfite and ferrous sulfate.

The foregoing four types of polytetrafluoroethylene were ground using the following two types of pulverizers.

(1) Micron mill

A pulverizer of the type which grinds chiefly by the action of a shearing force resulting from the rotation of multibladed rotor (a product of Hosokawa Iron Works Ltd., Japan).

(2) Ultramizer

A pulverizer of the type which grinds chiefly by the action of impact force resulting from the pounding and crushing action of hammers fitted in such a fashion to the circumference of rotating disks that they are capable of freely moving within the plane of the rotating disks.

The properties of the ground products obtained are given in the following table.

| | | Grinding conditions | | | | Properties of ground product | | | |
|---|---|---|---|---|---|---|---|---|---|
| Specimen | Pulverizer | Peripheral speed of blades or hammer, m./sec. | Temperature, °C. | Classifier | Form | Average fiber length, μ | Average shape factor | Anisotropic expansion factor | Paper formability |
| Experiment: | | | | | | | | | |
| 1 ........ A | Micron mill | 45 | 100 | Used | Fibrous | 950 | 38 | 5.2 | Good. |
| 2 ........ A | ....do.... | 35 | 30 | ....do.... | ....do.... | 850 | 30 | 1.70 | Do. |
| 3 ........ A | ....do.... | 35 | 30 | Not used | ....do.... | 2,600 | 38 | 1.75 | Do. |
| 4 ........ C | ....do.... | 25 | 95 | Used | ....do.... | 900 | 36 | 5.1 | Do. |
| 5 ........ C | ....do.... | 25 | 80 | ....do.... | ....do.... | 800 | 30 | 4.5 | Do. |
| 6 ........ B | ....do.... | 35 | 40 | ....do.... | ....do.... | 360 | 25 | 1.72 | Do. |
| 7 ........ B | ....do.... | 35 | 85 | Not used | ....do.... | 1,900 | 35 | 5.3 | Do. |
| 8 ........ D | ....do.... | 35 | 30 | Used [1] | Nonfibrous | | [3] 5 | 1.22 | Unsatisfactory. |
| 9 ........ A | Ultramizer | 95 | 30 | ....do.[2] | ....do.... | | [3] 3 | 1.20 | Do. |
| 10 ....... B | ....do.... | 95 | 30 | ....do.... | ....do.... | | [3] 3 | 1.20 | Do. |

[1] Basket type classifier.
[2] Centrifugal type classifier.
[3] Values obtained by measurement by method described in Thomas et al. U.S. Pat. 2,936,301, since these were nonfibrous.

When the thermal properties of the fibrous powder obtained in Experiment 1 was measured at the rate of a rise in temperature of 10° C. per minute using a differential thermal analyzer Model DT–10 produced by Shimadzu Seisakusho Ltd., Japan, shoulders of heat absorption were observed 25 degrees after the heat absorption peak of 348° C. ascribable to the melting of the crystals.

EXAMPLE 2

Papers were molded using the various powders obtained from Example 1 and fibers cut from one of the commercial grades of polytetrafluoroethylene spun fibers to about 1 mm. length by fiber cutting procedures.

Three grams of the fibrous powders or cutting fibers were added to about 300 cc. of carbon tetrachloride and stirred well. The dispersions obtained were placed in 60-mesh metallic sieves 144 mm. in diameter. The sieves were immersed in advance in Petri dish containing carbon tetrachloride. Thus, by shaking the sieves, the dispersion is caused to spread out uniformly in the sieves. Then the sieves are removed from the Petri dish containing the carbon tetrachloride and dried, following which the powders or felts are heated along with the sieves to 345° C. in an air oven for about 30 minutes.

Papers 144 mm. in diameter and of a uniform thickness of about 0.2 mm. were obtained by this operation from the fibrous powders obtained in Experiments 1 to 7 of Example 1. On the other hand, papers could not be formed from the powders obtained in Experiments 8, 9 and 10 and the fibers obtained by fiber cutting. Namely, in the case of the nonfibrous powders, the self bonding between the particles was poor and further because they were not fibrous they could not be formed in the fashion of a paper but became a weak foraminous film. In the case of the fibers obtained by fiber cutting, the shrinkage of the fibers was great and hence paperlike products did not result, there occurring unevenness of spotty nature over the surface.

By a similar method, the fibrous powders obtained in Experiments 1–7 of Example 1 could be formed into thick sheets 1 mm. in thickness.

Not only were these papers and sheets pliable and could be folded, but their strength was also several times that of the ordinary paper. A particular feature is the point that there was no difference in their strength whether in water or air. This paper was effectively used particularly as filter paper in the filtration of strong acids and alkalis.

What is claimed is:

1. A polytetrafluoroethylene fibrous powder characterized by having an average fiber length of 100 to 5,000 microns, an average shape factor of not less than 10, and an anistropic expansion factor of 1.30 to 7.00, the number of fibrous powders having a length of less than 80 microns being excluded when calculating said average fiber length.

2. A polytetrafluoroethylene fibrous powder consisting essentially of fibrous powders having a fiber length of at least 80 microns, an average shape factor of not less than 10 and an anistropic expansion factor of 1.30 to 7.00, said fibrous powder having an average fiber length of 100 to 5,000 microns.

References Cited

UNITED STATES PATENTS

| | | | |
|---|---|---|---|
| 2,936,301 | 5/1960 | Thomas | 260—92.1 |
| 3,010,950 | 11/1961 | Thomas | 260—92.1 |
| 3,115,486 | 12/1963 | Weisenberger | 260—92.1 |
| 3,265,679 | 8/1966 | Black et al. | 260—92.1 |

ROBERT F. BURNETT, Primary Examiner

R. H. CRISS, Assistant Examiner

U.S. Cl. X.R.

161—169, 181; 264—127